United States Patent [19]

Florer

[11] 4,075,267
[45] Feb. 21, 1978

[54] METHOD AND APPARATUS FOR MAKING PRESSURE PLUGS IN CABLES OR CABLE STUBS WITH CONTINUOUS AIR FLOW

[75] Inventor: James W. Florer, Los Angeles, Calif.

[73] Assignee: Ciba-Geigy Corporation, Ardsley, N.Y.

[21] Appl. No.: 694,486

[22] Filed: June 9, 1976

[51] Int. Cl.² ............................................. H01B 13/00
[52] U.S. Cl. ....................................... 264/94; 137/317;
156/48; 174/11 R; 174/23 R; 264/267
[58] Field of Search ..................... 174/10, 11 R, 22 R, 174/23 R, 23 C; 156/48; 264/94, 267; 137/317

[56] References Cited

U.S. PATENT DOCUMENTS 1,826,716 10/1931 Bartenbach ............................ 156/48
3,290,194 12/1966 Gillemot ................................ 156/48

*Primary Examiner*—Laramie E. Askin
*Attorney, Agent, or Firm*—Wenderoth, Lind & Ponack

[57] ABSTRACT

A method and apparatus for forming pressure plugs in cable systems which are under continuous air pressure while maintaining a continuous air flow through the cable. A supplemental air source is connected to the pressurized cable casing on both sides of the area to be plugged to provide an auxiliary air pressure of sufficient quantity to override the normal pressure in the cable casing. Then, the pressure plug may be installed in the cable while the entire cable, and the selected portion of the cable being plugged, remain under adequate pressure to prevent any moisture from entering into the casing.

11 Claims, 1 Drawing Figure

METHOD AND APPARATUS FOR MAKING PRESSURE PLUGS IN CABLES OR CABLE STUBS WITH CONTINUOUS AIR FLOW

The present invention relates to a method and apparatus for forming pressure plugs in cable systems which are under continuous air pressure while maintaining a continuous air flow through the cable.

BACKGROUND OF THE INVENTION

In order to prevent moisture from entering and corroding the sensitive metallic conductor wire in the transmitting cables of modern communication systems, it has become commonplace to insulate these wires and house them in pressurized cable casings. The air pressure injected into the cable casings effectively prevents moisture from entering through any small openings which may from time to time appear in the casing. However, since the casing is subject to being punctured, every opening in the casing diminishes the air pressure in the overall system. This pressure loss diminishes the pressure difference between the inside of the cable casing and the moisture on the outside of the cable, and too many openings, or even one sufficiently large opening, will eliminate the effectiveness of a pressurized cable casing.

This pressure sustained in the cable casing is usually generated by an air dryer positioned at a central location to supply air under pressure into the cable system, and generally, the pressure maintained in most communications systems is approximately 10 psi. As the distance from the dryer along the cable increases, however, the pressure in the cable naturally decreases, and again, when the pressure gets too low, the effectiveness of pressurizing the cable casing is lost.

In order to maintain the required pressure throughout a given length of cable casing in spite of the distance from the central air source, it is often necessary to construct pressure plugs or pressure dams in the cable to isolate or restrict the air flow. The most widely used method of constructing such a pressure plug is to inject a plugging compound directly into the cable which will solidify and form the appropriate dam. One problem which is created by such a plugging technique, however, is the fact that up to now air pressure must be removed from the cable in order to prevent channeling of air through the plugging compound because of an imbalance in the flow of air as the plugging compound is injected into the cable. As a result, an increased amount of plugging compound and prolonged time for plugging the cable are unavoidable. To solve this problem, the pressure on the cable is either entirely removed therefrom or at least from that portion of the cable in which the plug is to be constructed, or a by-pass is constructed around that portion of the cable to eliminate the flow of air therethrough. In both cases, undersirable results can occur when the pressure is removed, because as mentioned above, once the pressure is removed from the cable, any moisture outside the cable is susceptible to entering into the cable casing through any openings which may be formed therein.

SUMMARY OF THE INVENTION

It is, therefore, an object of the present invention to overcome the disadvantage of the prior methods of plugging pressurized cables in which the air pressure must be removed from the cable, or at least a segment of the cable, before installing a pressure dam either by completely withdrawing the pressure from the cable system or by installing a by-pass around the selected segment wherein the plug will be installed.

In the present invention, a supplemental air source is connected to the pressurized cable casing on both sides of the area to be plugged to provide an auxiliary air pressure of sufficient quality to override the normal pressure in the cable casing. Then, the pressure plug may be installed in the cable while the entire cable, and the selected portion of the cable being plugged, remain under adequate pressure to prevent any moisture from entering into the casing.

BRIEF DESCRIPTION OF THE DRAWINGS

Further objects and features of the present invention will be apparent from the following description taken with the accompanying drawing wherein.

DETAILED DESCRIPTION OF THE INVENTION

Figure 1:
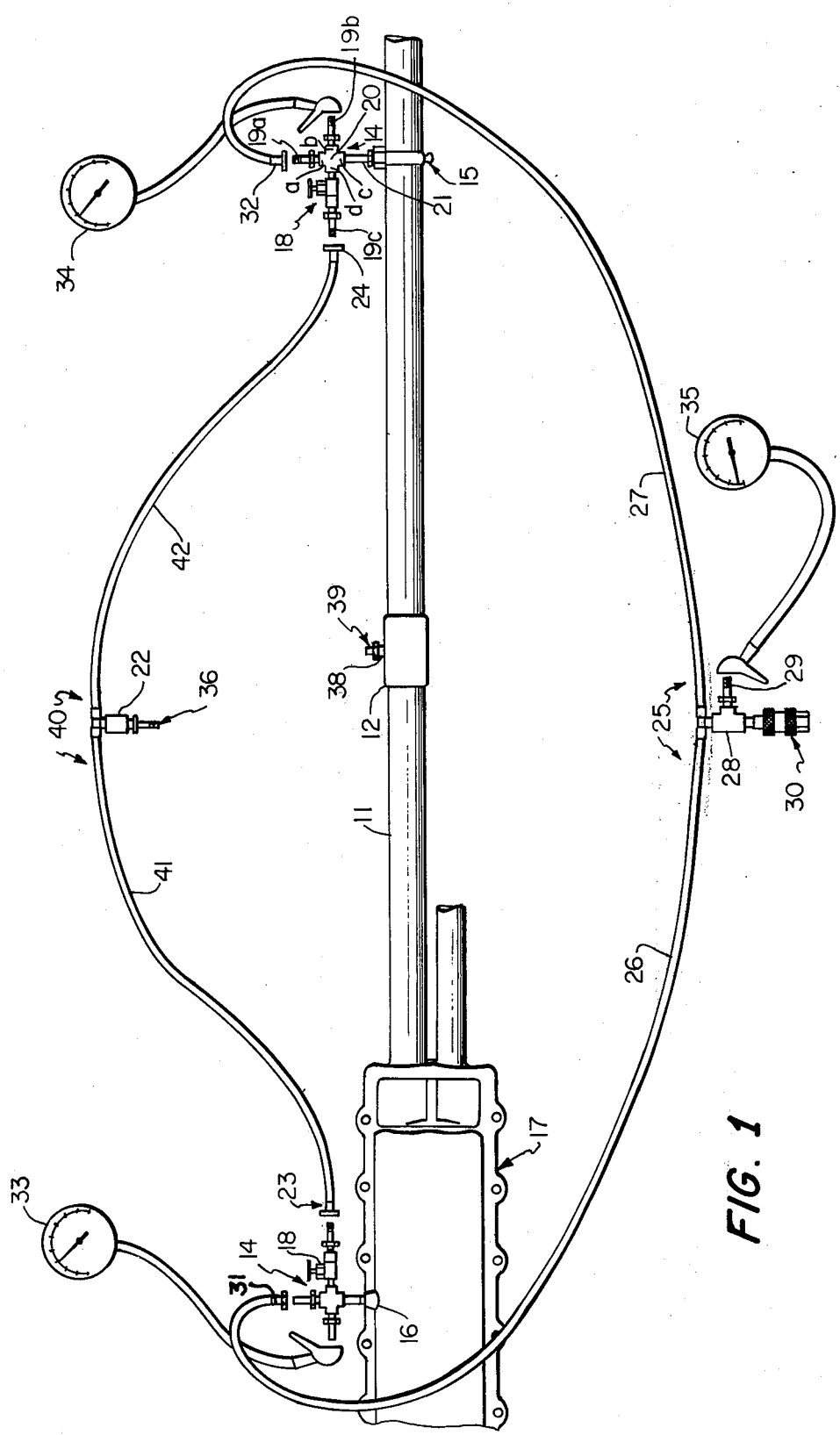
FIG. 1 is a schematic view of the apparatus of the present invention connected to a cable segment.

As shown in FIG. 1, a cable 11 has a pressure plug or dam location 12 at the central portion thereof. On both sides of this pressure plug location 12 and spaced therefrom are pressure valve cross-over assemblies 14, 14 fitted to cable 11 itself through an air/fluid fitting 15 ("F" flange or equivalent) or into a plug fitting 16 in a splice case 17 to which the cable 11 is connected. (The space case 17 is shown by way of example, as the cross-over assemblies 14,14 may be directly attached to the pipe with fittings such as 15 on both sides of the pressure plug location 12 if the plug 12 is not to be constructed near a splice case 17.)

The cross-over assemblies 14,14 each contain a needle valve 18, 18, three tank valves 19a, 19b and 19c, a central connecting cross-fitting 20 having four threaded openings a, b, c, d and a connecting tube 21. One of the tank valves 19a is connected to the uppermost opening a of the central connecting cross-fitting 20; the second tank valve 19b is connected to the side opening b of the connecting cross-fitting 20; and the connecting tube 21 is connected to the lower opening c of the connecting cross-fitting 20 and is also connected to the air/fluid fitting 15 or the plug fitting 16 in the splice case. The needle valve 18 is connected to the opening d of connecting cross-fitting 20, and the third tank valve 19c is connected to the needle valve 18.

Connecting the third tank valves 19c, 19c and the needle valves 18, 18 of the two cross-over assemblies 14,14, is an air pressure input assembly 40. The input assembly 40 has two pieces of flexible tubing 41,42 joined together at an input valve 22 (such as a tank valve). The ends of the flexible tubing connected to the tank valves 19c,19c have swivel chucks 23,24 attached thereto which are threaded to the tank valves 19c,19c.

Connecting the first tank valves 19a,19a of the cross-over assemblies 14,14 is an air equalization assembly 25. Like the input assembly 40, two flexible tubes 26,27 are joined together at a T-shaped connection 28. Also connected to the T-shaped connection are a tank valve 29 and a slide valve 30. The ends of the flexible tubes opposite the T-shaped connection 28 have swivel chucks 31,32 attached thereto which are threaded to the tank valves 19a,19a of the cross-over assemblies 14,14.

C-gauges 33,34,35 are respectively connected to the second tank valves 19b,19b of the cross-over assemblies 14,14 and the tank valve 29 connected to the T-shaped connection 28. However, one or two gauges may be used interchangeably between these valves without requiring three separate gauges.

At the pressure plug location 12 a pressure plug is formed from any type of pressure plugging device currently known in the art which will allow a plugging compound to be injected in between the conducting wires of a cable where it will set up and harden thereinbetween to form a pressure-resistant plug or dam. Attached to the plugging device opening 38 is an automatic shut-off valve 39 which will prevent the plugging compound injected into the cable 11, which is under pressure, from escaping out of the casing through the opening 38. This automatic shut-off valve 39 might be a flip-flop type of valve, a ball-bearing type of valve, or any type of one-way flow valve in which the back pressure of the plugging compound attempting to flow outward through the valve will close the valve opening.

Additionally, a supplemental dry air source 36 is connected to the air-pressure input assembly 40 at the input valve 22. The supplemental dry-air source may conveniently be a bottled gas, such as a 224 cubic foot dry nitrogen cylinder, or may be an auxiliary air dryer set up to provide an air source into the air pressure input assembly. Generally, a supplemental air source capable of producing an air pressure of 20 psi is most desirable.

With respect further to the drawing and the interrelation between the various structural features of this apparatus, the order of installation and sequential functioning of these elements is as follows. By following this procedure, a pressure plug can be constructed in the cable while maintaining the cable under a continuous pressure.

Initially, air pressure readings of the actual air flow in the cable casing to be plugged should be taken on both sides of the desired plugging location 12 to determine beginning pressure values. These pressure values may be taken with C-gauges at the air/fluid fittings 15 on either side of the plugging side (or at the fitting 16 in the splice case 17). If no "F" pressure valves are present in these fittings, standard air pressure flanges, such as at 15, may be attached through the cable sheath — preferably at least fifteen inches away from the proposed plug location — on each side of the plug location 12.

Once the initial pressures are determined and recorded, the "F" valves are removed from both locations and are replaced by the two pressure valve cross-over assemblies 14,14. During this replacement sequence, care should be taken to avoid as much air loss in the cable as possible. As the cross-over assemblies 14,14 are threaded into the F valve locations or the standard air pressure flanges 15, the assemblies should be threaded thereinto until the adjustable needle valves 18,18 face toward the proposed plug location 12 (that is, toward each other).

When the cross-over assemblies 14,14 are properly positioned, the knurled swivel chucks 23,24 of the air pressure input assembly 40 are attached to the tank valves 19c,19c of the cross-over assembly 14,14. At this time, the needle valves 18,18 should be completely open, and in order to minimize air loss from the cable, it is best to attempt to thread the swivel chucks 23,24 simultaneously — if possible.

Next, the air pressure equalization assembly 25 is connected between the cross-over assemblies 14,14. However, before the knurled swivel chucks 31,32 are threaded onto the tank valves 19a,19a of the cross-over assemblies 14,14, it is important to make sure that the slide valve 30 is completely closed (vent holes completely covered). Again, it is best to thread the swivel chucks 31,32 simultaneously if possible to help to alleviate air pressure loss in the cable.

At this point, the C-gauge 35 is attached to the tank valve 29 of the equalization assembly 25, and the system should be checked to determine whether there are any air leaks. If leaks are found, adjustments should be undertaken to correct any leakages.

A supplemental dry air source 36 is set up and the output regulator thereof is adjusted to the desired pressure. Generally, a pressure of 20 psi is most suitable. While a pressure of 20 psi is most desirable, it is not totally essential; however, lower pressures will probably result in lower air in the cable during the plugging operation thereby effecting the overall timing and condition of the pressure plug.

The supplemental air source 36 is then attached to the tank valve 22 of the input assembly — but before the dry air is connected, the slide valve 30 must be opened all the way to prevent applying the full 20 psi pressure to the cable, which may damage the cable system or the C-gauges. (The slide valve 30 is, of course, opened by pulling down the knurled portion to expose the vent holes.)

As the air source 36 is attached at the air pressure input assembly 40, air begins to flow and a loud hiss will result from the air escaping through the open slide valve 30. The C-gauge 35 will read close to 0. The pressure reading on the C-gauge 35 is then adjusted to 0.50 psi by slightly closing the slide valve 30. Again, it is important not to completely close the slide valve 30 or damage may occur to the C-gauge 35.

The C-gauge 33 is then connected to the tank valve 19b of the cross-over assembly 14. The operator performing the plugging procedure should be able to view this gauge 33 at all times, so it should be positioned easily within his view. The reading of this gauge should be between 2 psi and 5.5 psi for a standard cable under 10 psi pressure, thereby indicating the pressure flow down and through the cable. This is a general pressure reading and will vary somewhat depending upon the size and type of cable, the cable condition, distance, backfeed and similar cable characteristics.

The remaining C-gauge 34 is attached to the tank valve 19b of the other cross-over assembly 14. The necessity of this second C-gauge attached to the cross-over assembly may be eliminated by moving the C-gauge 35 back and forth between the equalization assembly and the cross-over assembly, as the gauge attached to the equalization assembly 25 is used simply to verify the 0.50 psi pressure in that assembly.

At this point, the readings on the C-gauges 33,34 on the cross-over assemblies 14,14 should be nearly equal. If, however, one side is slightly higher, the needle valve 18 at the cross-over assembly on the higher side may be adjusted to bring about a balanced reading between the two gauges 33,34.

With all of this equipment in position, the cable is now ready for the injection of the pressure plug at 12 into the cable. Various products are now on the market specifically designed to plug different types of communications cables such as pulp or paper insulated cable, (P O P) or plastic insulated cable (PIC). Depending on the exact composition of the plugging compound to be injected into the cable and the method and equipment used to inject the plugging compound into the cable, the exact amount of plugging compound and the time required for the compound to "set" and form the solid pressure plug will vary. However, no matter what type of equipment is used to inject the plugging compound into the cable, the process of the present invention will remain substantially the same. Therefore, since the apparatus of the present invention is installed on both sides of the plugging location, the actual device for injecting the plugging compound into the cable may be connected to and into the cable following the specific procedure for that definite injecting device.

Once the plugging equipment is in position, and the plugging compound begins to be injected into the cable, a general imbalance in air pressure will be seen on the C-gauges 33 and 34. When the imbalance becomes apparent on these gauges 33,34, the pressure readings of the gauges should be continuously equalized by adjusting the needle valve 18 on the higher pressure side. This continuous maintenance of equalized pressure on both sides of the plug is important, because imbalances of the air pressure may cause unequal flow of the plugging compound in the cable and may result in air leaks or plug failures.

When the predetermined amount of plugging compound necessary to plug the cable under the given conditions for the specific type of plugging equipment has been completely injected into the cable, the opening 38 where the plugging compound was injected is closed and the equalized pressure is maintained on the plugging compound in the cable until the compound is sufficiently set to form a functional plug or dam in the cable. The specific time for the compound to set, of course, varies with the type of plugging compound used, and such factors as the ambient temperature and the temperature of the compound when injected.

As soon as the conditions for functional setting of the pressure plug have been satisfied, the supplemental air source 36 may be discontinued and the air pressure input assembly 40, the air pressure equalization assembly 25, and the pressure valve cross-over assemblies 14,14 may be removed from the plugged cable and the plug fittings 15,16 closed.

As pointed out above, the actual procedure and equipment for plugging the cable need not be specially designed for use with the apparatus and method of the present invention so long as the plugging compound is injected into the cable following the manufacturer's instructions for the specific type of plugging operation (PIC or POP insulated cables). Two products on the market specifically designed to inject cable plugging compound into insulated cables are the G-117 KOR-PLUG Kit using RP-6004 PIC - Plug Damming Compound (a two-component polyurethane system) for plugging single sheath PIC cables and the G-6031 Single Sheath POP Damming Kit using RP-6000 POP-Plug Damming Compound (a two-component polyurethane compound) for plugging POP insulated cables. All of these products are marketed by REN Communications Products.

By connecting the apparatus of the present invention according to the procedure as outlined herein to the cable to be plugged, the cable is then ready for installation of either of these plugging kits as demanded by the specific type of cable. The manufacturer's instructions should be fully followed for preparing the cable surface, opening the cable sheath, inserting the injecting plug which delivers the plugging compound into the cable, and securing and sealing the injecting plug in position.

Once the apparatus for injecting the plugging compound is in position, the cable is ready for the injection of the plugging compound according to the manufacturer's recommendations while following the pressure equalization techniques of the present invention. For example, the RP-6004 PIC-Plug Damming Compound may be injected in the quantities shown in Table 1 in regard to cable diameter, and the RP-6000 POP-Plug Damming Compound may be injected as shown in Table II.

TABLE I

RP-6004 QUANTITY GUIDE

| Cable Diameter | Ounces Required |
|---|---|
| 1.00" | 6 |
| 1.25" | 8 |
| 1.50" | 12 |
| 1.75" | 16 |
| 2.00" | 22 |
| 2.25" | 24 |
| 2.50" | 30 |
| 2.75" | 36 |
| 3.00" | 42 |

TABLE II

RP-6000 QUANTITY GUIDE

| Cable Diameter | Ounces Required |
|---|---|
| 1.00" | 12 |
| 1.25" | 16 |
| 1.50" | 22 |
| 1.75" | 30 |
| 2.00" | 36 |
| 2.25" | 42 |
| 2.50" | 48 |
| 2.75" | 54 |
| 3.00" | 60 |

It is, however, important to realize that cable conditions can vary, and the manufacturer's recommendations may on occasion vary according to temperature and cable conditions. Therefore, the plugging compound should be injected until a sufficient back pressure is attained, thereby indicating that the compound is filling the cable. While the plugging compound is being injected into the cable, the C-gauges 33 and 34 must be continuously monitored to ensure that the pressure on both sides of the plugging compound is equalized by adjusting the needle valve 18 on the higher pressure side.

Following the procedure of the present invention and utilizing either of the above specific types of plugging compound and plugging equipment will generally result in a pressure plug capable of withstanding 10 psi 30 minutes after the RP-6004 compound is injected into a PIC cable at 72° – 80° F. or 90 minutes after the RP-6000 compound is injected into a POP cable at 72° – 80° F. Once the specific type plug is set or cured to withstand the minimum conditions prescribed for the particular situation, the pressure equalization equipment can be removed as explained above.

While the present invention has been described by way of example in conjunction with the two specific types of cable plug injecting systems produced by REN Communications, it is by no means intended to be limited to use with these specific systems.

What is claimed is:

1. An apparatus for maintaining a continuous air flow through a cable under continuous air pressure during formtion of a cable pressure plug in said cable, said apparatus comprising:
   a supplemental air source;

air pressure input assembly means connected to said supplemental air source for routing the air therefrom;

pressure valve crossover assembly means connected to said cable on each side of and spaced from the proposed location of said cable pressure plug and connected to said air pressure input assembly means for regulating and directing the flow of air coming from said air pressure input assembly means;

adjustable air pressure equalization assembly means connected between said pressure valve crossover assembly means on both sides of said proposed cable plug location for maintaining an adjusted equalized pressure therebetween; and at least one gauge means adapted to be connected to said pressure valve crossover assembly means and said air pressure equalization assembly means for determining the air pressure thereat.

2. An apparatus as claimed in claim 1 wherein each pressure valve crossover assembly means is comprised of:

a central cross-fitting having four openings thereinto;

a first valve means connected to a first opening in said central cross-fitting for connecting said cross-fitting to said air pressure equalization assembly means;

a second valve means connected to a second opening in said central cross-fitting for connecting said cross-fitting to said gauge means;

a third adjustable valve means connected to a third opening in said central cross-fitting for connecting said cross-fitting to said air pressure input assembly means and for adjusting the flow of air from said air pressure input assembly means; and connecting means connected to a fourth opening in said central cross-fitting for connecting said cross-fitting to said cable.

3. An apparatus as claimed in claim 2 wherein:

said first and second valve means are tank valves; and said third valve means is comprised of an adjustable needle valve connected to said third opening in said central cross-fitting and a tank valve connected between said needle valve and said air pressure input assembly means.

4. An apparatus as claimed in claim 1 wherein said air pressure input assembly is comprised of:

an input valve connected to said supplemental air source; and two pieces of flexible tubing, each connected to said input valve at one end and to one of said pressure valve cross-over assembly means at the other end.

5. An apparatus as claimed in claim 1 wherein said air pressure equalization assembly means is comprised of:

two pieces of flexible tubing, each connected at one end to one of said pressure valve crossover assembly means;

a fourth valve means operatively connected to the free ends of said flexible tubing for connecting to said gauge means; and an adjustable fifth valve means connected to said fourth valve means for adjusting the flow of air through said flexible tubing between said pressure valve crossover assembly means, whereby the pressure between the crossover assembly means is equalized.

6. An apparatus as claimed in claim 5 wherein:

said fourth valve means is a tank valve; and said fifth valve means is a slide valve.

7. An apparatus as claimed in claim 1 wherein said gauge means is a C-gauge.

8. A method for forming a cable pressure plug in a cable under continuous air pressure while maintaining continuous air flow through said cable, said method comprising:

determining the air pressure in said cable on both sides of the proposed pressure plug location;

installing two pressure valve crossover assembly must spaced from each other, one on each side of the proposed pressure plug location;

connecting an air pressure input assembly means between both of said air valve crossover assembly means;

connecting an air pressure equalization assembly means between both of said pressure valve crossover assembly means, said air pressure equalization assembly means having an adjustable pressure release valve;

connecting gauging means to each of said pressure valve crossover assembly means and to said air pressure equalization assembly means;

opening said pressure release valve in said air pressure equalization assembly completely;

adjusting a supplemental air source to a desired output pressure and attaching said supplemental air source to said air pressure input assembly means;

adjusting said pressure release valve of said air pressure assembly means to continuously maintain a constant air pressure through said air pressure assembly means;

adjusting said pressure valve crossover assembly means to achieve equal pressure readings on said gauging means attached thereto by regulating downward the crossover assembly means on the higher pressure side;

preparing said cable and installing a pressure plug injecting means at the proposed pressure plug location;

injecting a predetermined amount of pressure plug forming compound into said cable through said pressure plug injecting means;

continuously maintaining a constant pressure on both sides of said pressure plug location by adjusting the crossover valve assembly means on the higher pressure side while said compound is being injected into said cable;

closing the pressure plug injecting means after all of the plugging compound has been completely injected into said cable;

maintaining equalized pressure on both sides of said plug location until said plugging compound is set; and discontinuing the supplemental air supply once said plugging compound is set, and removing said air pressure input assembly means, said air pressure equalization assembly means and said pressure valve crossover assembly means from said cable.

9. A method as claimed in claim 8 wherein said supplemental air source is adjusted to produce an output of 20 psi.

10. A method as claimed in claim 9 wherein said pressure release valve of said air pressure assembly means is adjusted to continuously maintain a pressure of 0.5 psi through said air pressure equalization assembly means.

11. A method as claimed in claim 10 wherein closing said pressure plug injecting means is achieved by an automatic shut-off valve means attached thereto for preventing the plugging compound injected into said cable through said plug injecting means from being ejected out of the cable through said plug injecting means.

* * * * *